U S008149210B2

(12) United States Patent
Klier et al.

(10) Patent No.: US 8,149,210 B2
(45) Date of Patent: Apr. 3, 2012

(54) POINTING DEVICE AND METHOD

(75) Inventors: Zvi Klier, Tel-Aviv (IL); Sagi Katz, Yokneam (IL); Mattias Marder, Haifa (IL); Giora Yahav, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 652 days.

(21) Appl. No.: 12/003,705

(22) Filed: Dec. 31, 2007

(65) Prior Publication Data

US 2009/0167679 A1 Jul. 2, 2009

(51) Int. Cl.
*G09G 5/00* (2006.01)
(52) U.S. Cl. ............ 345/156; 345/157; 345/158; 463/36
(58) Field of Classification Search .................. 345/156, 345/157, 158; 463/2–6, 31, 36, 37
See application file for complete search history.

(56) References Cited

U.S. PATENT DOCUMENTS

| 6,057,909 | A | 5/2000 | Yahav et al. |
| 6,072,494 | A | 6/2000 | Nguyen |
| 6,222,465 | B1 | 4/2001 | Kumar et al. |
| 6,531,999 | B1 * | 3/2003 | Trajkovic ..................... 345/157 |
| 6,937,742 | B2 | 8/2005 | Roberts et al. |
| 6,950,534 | B2 | 9/2005 | Cohen et al. |
| 6,993,255 | B2 | 1/2006 | Braun et al. |
| 7,098,891 | B1 * | 8/2006 | Pryor ............................ 345/158 |
| 7,151,530 | B2 | 12/2006 | Roeber et al. |
| 7,227,526 | B2 * | 6/2007 | Hildreth et al. ............... 345/156 |
| 7,340,077 | B2 | 3/2008 | Gokturk et al. |
| 7,646,372 | B2 * | 1/2010 | Marks et al. ................... 345/156 |
| 2004/0046736 | A1 * | 3/2004 | Pryor et al. .................... 345/156 |
| 2006/0033713 | A1 * | 2/2006 | Pryor ............................ 345/158 |
| 2006/0132432 | A1 * | 6/2006 | Bell ............................... 345/156 |
| 2006/0139314 | A1 * | 6/2006 | Bell ............................... 345/156 |
| 2006/0187196 | A1 * | 8/2006 | Underkoffler et al. ........ 345/156 |
| 2006/0202953 | A1 * | 9/2006 | Pryor et al. .................... 345/156 |
| 2007/0024579 | A1 | 2/2007 | Rosenberg |
| 2007/0132721 | A1 * | 6/2007 | Glomski et al. .............. 345/156 |
| 2007/0298882 | A1 * | 12/2007 | Marks et al. ..................... 463/36 |
| 2008/0056561 | A1 * | 3/2008 | Sawachi ........................ 382/154 |
| 2008/0122786 | A1 * | 5/2008 | Pryor et al. .................... 345/156 |

OTHER PUBLICATIONS

Oggier, T., M. Lehmann, R. Kaufmann, M. Schweizer, M. Richter, P. Metzle, G. Lang, F. Lustenberger and N. Blanc, An all-solid-state optical range camera for 3D real-time imaging with sub-centimeter depth resolution (SwissRanger™), Proc. of SPIE vol. 5249, pp. 534-545, Optical Design and Engineering, 2004.*

(Continued)

*Primary Examiner* — Amare Mengistu
*Assistant Examiner* — Dmitriy Bolotin
(74) *Attorney, Agent, or Firm* — Vierra Magen Marcus & DeNiro LLP

(57) ABSTRACT

A system and method for identifying a pointing organ or a pointing device in a field of imaging of a 3-D imaging system and for calculating a line of pointing relative to this organ or device are disclosed. The method and system may be used to enable a user to communicate with computer programs, such as computer games, 3-D design programs and the like. The method and system may further employ a trigger-like mechanism to identify a movement of a user that may be interpreted as trigger activation.

12 Claims, 4 Drawing Sheets

OTHER PUBLICATIONS

Yi-Ping Hung et al.: "Free-hand pointer by use of an active stereo vision system" Pattern Recognition, 1998. Proceedings. Fourteenth International Conference on Brisbane, Qld., Australia Aug. 16-20, 1998, Los Alamitos, CA, USA, IEEE Comput. Soc, US, vol. 2, Aug. 16, 1998, pp. 1244-1246, XP010297853 ISBN: 978-0-8186-8512-5 the whole document.

Michael Van Den Bergh et al.: "Perceptive User Interface, a Generic Approach" Computer Vision in Human-Computer Interaction Lecture Notes in Computer Science; ;LNCS,Springer, Berlin, DE, vol. 3766, Jan. 1, 2005, pp. 60-69, XP019022557 ISBN: 978-3-540-29620-1 the whole document.

Kelvin Chen, Masahiru Takatsuka: "Estimating Pointing Direction in 3D using Monocular Tracking for Direct Interaction with Large Screens—Report 599" Oct. 2006, Vislab School of Information Technologies the University of Sydney, XP002521763 the whole document.

PCT International Search Report PCT/IL2008/001703 mailed Nov. 2, 2009.

Jun-Hyeong Do, et al. "Soft Remote Control System using Hand Pointing Gestures" div. of EE, Dept. of EECS, Kaist, 373-1 Guseong-dong, Yuseong-gu, Daejeon, 305-701, Republic of Korea; HWRS-ERC, Kaist, 373-1 Guseong-dong, Yuseong-gu, Daejeon, 305-701, Republic of Korea.

"3D Gesture Recognition Platform for Game and Application Developers", IISU Product Datasheet, Soft Kinetic Building Natural Interfaces 2008, 24 Avenue L. Mommaerts 140 Brussels Belguim.

Fukumoto Masaaki et al. "Finger-Pointer: Pointing Interface by Image Processing" Oct. 22, 1997.

Gerg Isaac D. "An Introduction and Overview of a Gesture Recognition System Implemented for Human Computer Interaction", The Pennsylvania State University Schreyer Honors College, Department of Computer Science & Engineering, Summer 2004, A thesis submitted in partial fulfillment of the requirements for a baccalaureate degree in Computer Engineering with honors in Computer Engineering.

Nickel, Kai and Stiefelhagen, Rainer, "Real-time Recognition of 3D-Pointing Gestures for Human-Machine-Interaction", Pattern Recognition, 25th DAGM Symposium, Sep. 10-12, 2003, Proceedings 2003, 8 pages, Magdeburg, Germany.

Malerczyk, Cornelius, "Interactive Museum Exhibit Using Pointing Gesture Recognition", WSCG '2004, Feb. 2-6, 2004, 7 pages, UNION Agency, Plzen, Czech Republic.

Communication Pursuant to Rules (161)(1) and 162 EPC dated Aug. 17, 2010, European Application No. 08868690.2.

Response to Communication Pursuant to Rules (161)(1) and 162 EPC filed Sep. 14, 2010, European Application No. 08868690.2.

Chinese Office Action dated Dec. 7, 2011, Chinese Patent Application No. 200880127687.8, filed Dec. 31, 2008, 11 pages.

Partial English Translation of Chinese Office Action dated Dec. 7, 2011, Chinese Patent Application No. 200880127687.8, filed Dec. 31, 2008, 7 pages.

* cited by examiner

POINTING DEVICE AND METHOD

BACKGROUND OF THE INVENTION

Depth measurement in video scenery in general and Gesture Recognition are topic in computer science with goal of interpreting gestures of human or other bodies via specialized equipment and mathematical algorithms. Gestures may originate, for example, from any bodily motion or state. Some systems use two video stereo cameras together with a positioning reference such as a set of infrared emitters to enable automated recognition of the contour of a body in the field of view of the cameras and to identify certain movements of organs or portions of the body so that the identified movements or gestures may be used for communicating of the human with application running in communication with the gesture recognition system. Some of the systems using stereoscopic gesture identification rely on a process which pairs features of a first stereo video image with features of a second stereo video image.

Other systems may employ depth measurement of points on a body in the field of imaging (FOI) using a method known as Time of Flight (TOF), in which an irradiating source sends pulsed light towards the imaged body. The pulsed light travels to the body and is reflected back to a video camera that is equipped with a shutter to control the timing of receipt of light onto its sensor. Since the time takes to a reflected light from a point on the imaged body is relative to the distance (or depth) of that point from the camera, with proper synchronized gating light from the nearer point to be received at the sensor for a longer time longer than light that travels from a farther point on the body. Accordingly, the amount of energy (which may be represented as "grey level" in the 2-D buffer of the sensor) is inversely proportional to the distance of the point from the sensor. In order to compensate for variations in the reflectivity of different points on the body mathematical measures may be taken, such as normalizing the intensity based on an average intensity at point.

Depth measurement using TOF principals may also be done by calculating the distance of a point in the FOI by calculating the time that takes to a pulse of light to travel to the point and back to the sensor, and use this figure to calculate the distance (or depth) of that point. Another method of measuring depth of a point on an imaged body is by measuring the phase-shift of the reflected light when it is received by the sensor, with respect to the phase of the emitted light towards the body.

Some of the known methods which use a stereoscopic arrangement of cameras need also comparatively a large amount of computations in comparing the pictures taken from one camera to those taken by the other camera in order to pair together pictorial attributes of the two sets of pictures for creating calculated 3-D image out of the pairs of pictures based on the known location of the two cameras. Large amount is needed in such arrangements also in real time to solve the trigonometric equations involved in the establishment of a distance of a point. Naturally, the accuracy of such systems is highly influenced by the physical dimensions of the set of two cameras and especially the distance between the cameras, thus requirement for higher accuracy may impose larger physical dimensions of such systems.

Furthermore, use of methods such as stereoscopic gesture recognition is inherently inferior to other methods, such as depth measuring methods, for example measurement of time-of-flight (TOF) of a light pulse by a depth measuring arrangement and inclusion of that data into the graphical data of the picture, when it is required to recognize several body organs positioned close and in front of each other, such as a finger in front of a hand palm or in front of human face, or the like.

It may therefore be beneficial to have system and method which are capable of capturing and calculating 3-D imaging data of a body in the field of imaging of a 3-D capturing system which is accurate enough to allow distinction of organs positioned closely one in front of the other and that may maintain small physical dimensions regardless of the accuracy requirements and may require small amount of associated calculations.

SUMMARY OF THE INVENTION

A system and method for intuitively pointing and possibly also shooting in a computer based man-machine interactive environment is disclosed. The intuitive pointing may be carried out, according to some embodiments of the present invention, without needing any actual pointing device, but via use of, for example, an organ of the user's body such as a hand stretched out to point at the target on the screen of the computerized system. The system and method are based on a 3D imaging ability of the system of the present invention, using, for example, TOF 3D imaging. The system may provide identification of a predefined organ, to locate a pointing location on the organ—for example the tip of a first finger in said stretched hand, to draw an imaginary line from, for example, an eye of the user through that point and use this imaginary line to calculate a point on the screen where this line intersects the screen.

The system and method of the present invention may further identify another location on the users body, such as a second finger of said stretched hand that, which may indicate, when its movement was detected, activation state (such as pull of a trigger).

In yet another embodiment a system and method of the present invention may use a pointing device formed, for example, as a pistol, that may be held by a user and pointed at a point on the screen of the system. In such embodiment the pointing device may be identified by a 3D imaging device, at least two points on the pointing device may specifically be identified and may be used to calculate a line of pointing and/or shooting at the screen of the system. According to yet another embodiment, a pointing device may have a trigger like mechanism that may activate/deactivate a recognizable area on the pointing device (such as, for example, a reflective area) so that when such area is visually disclosed by the activation of the trigger it is noticed by the imaging system and may be interpreted as a command to the system. In yet another embodiment, the trigger mechanism may activate a light source, such as a laser light emitting diode (LED), to indicate activation of the trigger to the imaging system.

In an additional embodiment of the present invention a reflective area and/or a light source, used to indicate activation of the trigger, may further be used to assist in, and enhance the accuracy of the calculation of the pointing/shooting line of the pointing device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
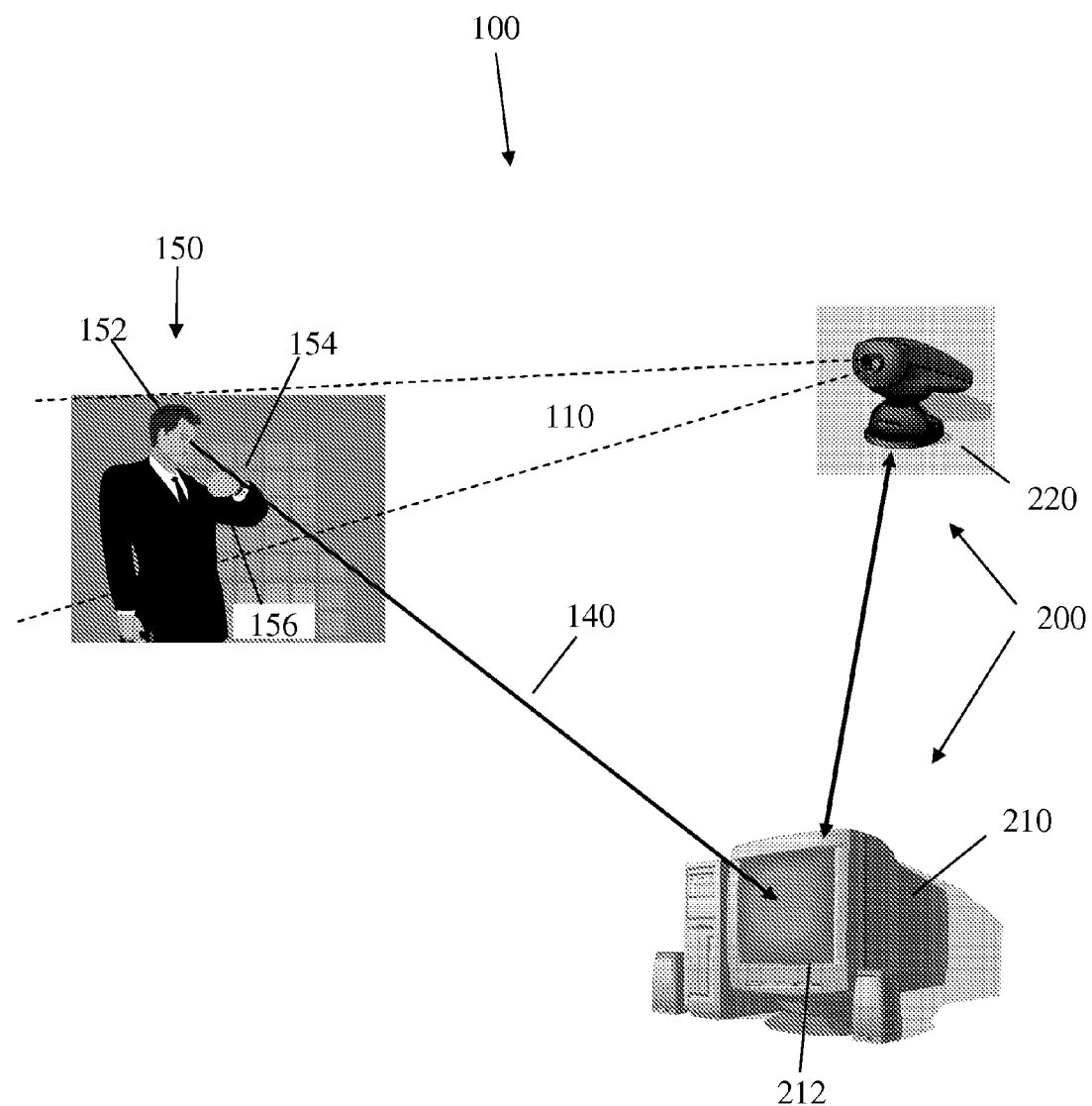
FIG. 1 is a schematic illustration of a system for remotely and intuitively providing control commands to computerized system, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements

DETAILED DESCRIPTION OF THE INVENTION

In the method based on the Time-Of-Flight (TOF) principle, the depth information may be captured and acquired by emitting pulses of radiation to all objects in the scene and sensing the reflected light from the surface of each object. Depth information for each pixel may be transmitted using an additional channel (which called in some instances 'D' channel). The information representing the depth of a pixel may be interpreted in a suitable computing system. All objects in the scene may then be arranged in layers according to the distance information sensed by the depth pixels in the camera, providing the depth information in real time as standard black and white video where the grey-level correlates to relative distance. In this method, color data may be provided, for example, by using a normal color imaging sensor.

3-D imaging of a body based on TOF is described in several references, including U.S. Pat. No. 6,057,909 for the applicant of the present invention. TOF 3-D imaging may support quick and relatively accurate acquiring of depth information of a scanned body in typical range of up to typically several meters at 60 HZ camera frame rate, using NIR wavelength and gating interval in the order of several nanoseconds.

These benefits of depth measurement and 3-D imaging of TOF based systems may be used in several applications. One of these applications is the Line of Sight (LOS) recognition and use of same for interactive control of a computer.

Several types of aiming devices are well known, such as a joy stick, a mouse, a track ball and the like. Such pointing devices (PDs) are used for long time now, and suffer of several drawbacks. For example, use of a joy stick may provide relatively quick movement of a cursor on a reference area, such as a screen, but are usually hard to control for final accuracy of position. Use of a trackball may provide good final accuracy but relatively slow movement toward the final position. A mouse is typically a moderate compromise of the previous two. Further, use of a mouse or of a track ball is usually cumbersome and require either a relatively large device (track ball) or large free area for movement (mouse). Yet, none of these PDs is intuitive in its operation and each of them requires certain training when first used and imposes certain inconvenience and even health hazards under long use.

The present invention provides system and method for accurate and intuitive pointing measures to be used by a user in interaction with a computerized system, in order to give control commands to the computerized system. Attention is made now to FIG. 1, which is a schematic illustration of a system 100 for remotely and intuitively providing control commands to computerized system, according to embodiments of the present invention. Control commands to computerized system 200 may be based on gesture recognition of the body 150 of a user by use of 3-D imaging, such as TOF method. System 100 may comprise a computerized system 200 comprising at least a computer 210 and a camera 220. Computer 210 may comprise a computing unit loaded with an appropriate software and a screen 212 on which said software may present graphical images, symbols and other presentable data which may require response from a user having a body 150 by way of pointing at a graphical entity on screen 212 and possibly further by dictating the computerized system 200 what are the commands that need to be effected to that graphical entity. Computerized system 200 may be further loaded with a piece of software which supports 3-D depth measurement of a body based on, for example, TOF principles. Based on the 3-D imaging the momentary position in space of certain points on body 150, such as a first point 152, located for example at the iris of an eye of user's body 150 and a second point 154 located, for example at the end of pointing finger of the user's hand. Camera 220 may have a spatial section of interest covering at least section 110 and may it be located slightly aside of screen 212. Yet in another embodiment of the present invention camera 220 may be located very close to screen 212. The use of 3-D imaging based on TOF calculations is known and may provide continuous data of the spatial position of points 152 and 154. Accordingly, computing system 200 may continuously provide data representing the line-of-sight (LOS) 140 connecting points 152 and 154 and extending to screen 212. In some embodiments, the initial location of screen 212 with respect to camera 220 may need to be calibrated. Such calibration may involve pointing at an intended point on the screen and instructing system 200 of the difference between the intended point and the point at which system 200 has calculated the hit-point of LOS 140. Such calibration may be required each time the setting of screen 212 has changed with respect to camera 220 and it may be done using, for example, a specific piece of software that when run controls the calibration process.

According to some embodiments of the present invention a user may intuitively point at a desired point on screen 212 and aim at a selected graphical entity on it, without needing to have any specific device and without needing to be connected, by wire or wirelessly, to system 100 for this purpose. Using the principles of TOF based 3-D imaging it is further possible to recognize gesture movement of an additional organ or a portion of an organ in user's body 150, such as, for example, left-hand long finger 156. Computerized system 200 may be trained to recognize plurality of different movements and gestures of user's body 150 and/or of organs of body 150 and to accord certain, predefined command to each such organ and/or movement. For example, in the pointing example detailed above while the computation of LOS 140 may be used for selecting one graphical entity on screen 212, gesture recognition of long finger 156 may be used for providing one or more control commands to that graphical entity, such as, in a non-limiting example, activation of software associated with that entity or for rotating a graphical symbol on the screen or for expending its size, and the like. It would be apparent for a person skilled in the art that pointing at a graphical entity on the screen is a most intuitive yet accurate way of performing point-and-select action since it fully imitates the natural action daily performed by humans. It would be apparent for person skilled in the art that additional to the devices and units described above system 100 may further comprise another camera (not shown) for providing graphical imaging of the user's body 150, as well as other units and capabilities.

Figure 2:
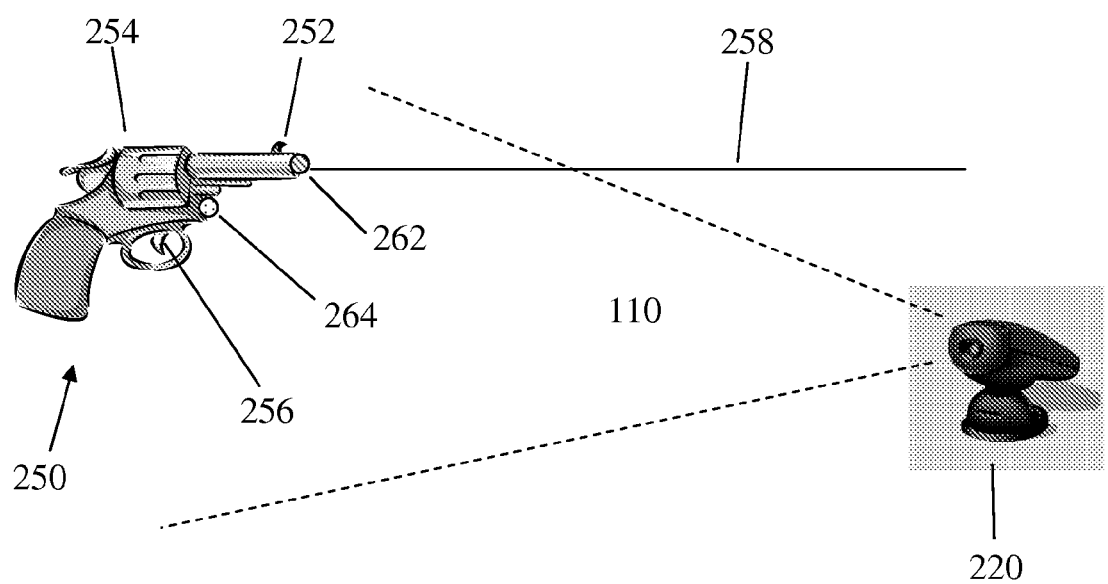
FIG. 2 is a schematic illustration of a system comprising a pointing device for intuitive pointing according to embodiments of the present invention.

According to additional embodiment of the invention a user may use a pointing object which is completely inactive (i.e. not connected, electrically, to system 100) in order to point at a selected graphical object on screen 212 and further to activate or inactivate software programs at the user's command. Attention is made to FIG. 2, which is a schematic illustration of a system comprising a pointing device 250 for intuitive pointing according to embodiments of the present invention. Pointing device 250 may be a passive device which does not require any electrical connection to system 100 of FIG. 1. Pointing device may be formed to comfortably fit into a user's hand, such as like a pistol. Yet, it would be apparent that pointing device may have any other shape, as may be desired, according to the applications to which it is adapted, to the user's preferences, etc. An imaginary line-of-pointing 258 may be defined as the "line-of-firing" of pointing device 250. As described above, system 100, to which pointing device 250 may be connected, may identify line 258 according to the principles of operations described above. In another embodiment of the present invention pointing device 250 may further include a frontal visual point 252 and a rear visual point 254 defined in close vicinity to line 258 in pointing device 250. Visual points 252 and 254 may be placed on pointing device 250 so that they are easily seen by camera 220 when pointing device 250 is in the field of view 110 of camera 220. Visual points 252 and 254 may further have distinct visual property, such as a high reflective feature, reflectivity with specific color or phase, and the like. This feature may be used to ease the identification of the gesture of pointing device 250 for purposes of identification of line-of-pointing 258. According to embodiment of the present invention pointing device 250 may further be equipped with a trigger-like assembly 256. Assembly 256 may be designed so that when pulled by the user it discloses a reflective area 264 that is visible to and identifiable by camera 220. Accordingly, camera 220 may identity that trigger 256 was pulled, and may send this information to system 100, in order to activate, for example, a relevant piece of software. In an embodiment of the present invention pointing device may comprise a light source 262 which may be activated/deactivated by pulling/releasing trigger 256. As with reflective area 264, light source 262 may indicate to system 100, when identified as in ON status, that trigger 256 was activated.

In yet another embodiment of the present invention either reflective area 264 or light source 262, when identified by camera 220 and system 100, may further be used to improve the accuracy and certainty of calculation of pointing line 258 by adding a third point with high certainty of identification as their location in pointing device may be pre-loaded to system 100.

Figure 3A:
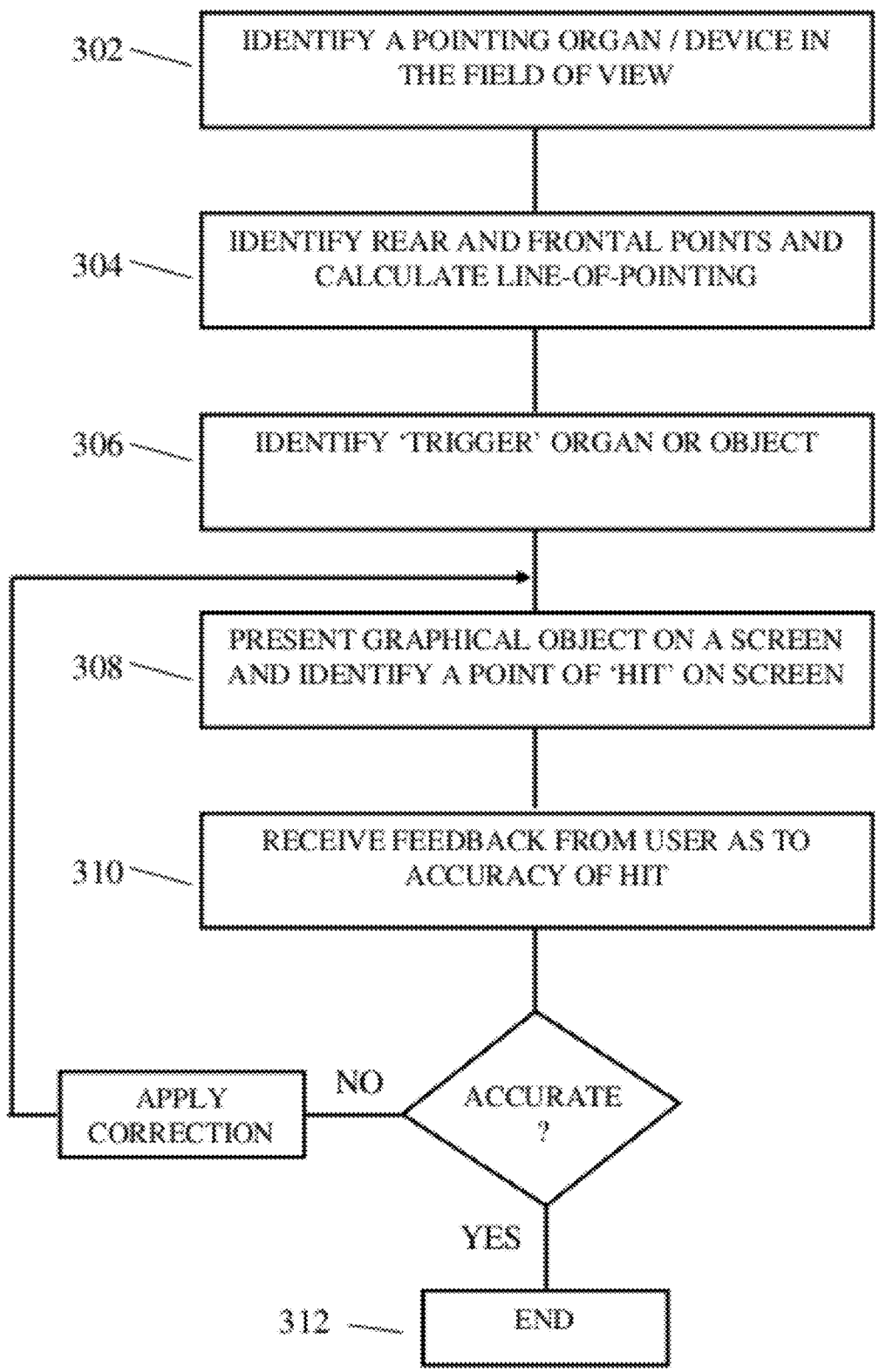
FIGS. 3A and 3B are schematic flow charts illustrating a method of calibrating the accuracy of pointing and a method of using a pointing object, respectively, according to embodiments of the present invention.
Figure 3B:
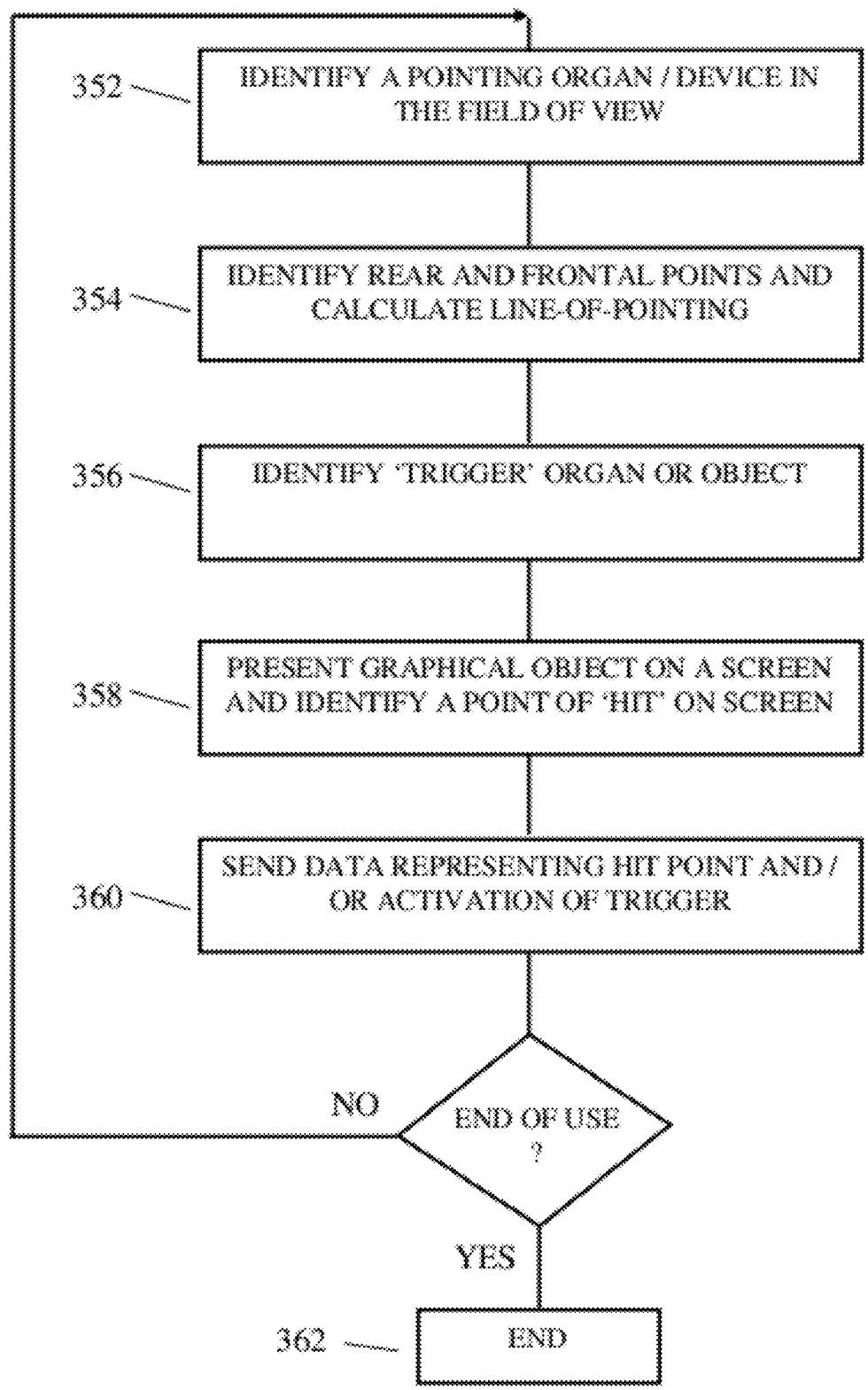

Attention is made now to FIGS. 3A and 3B which are schematic flow charts illustrating a method of calibrating the accuracy of pointing and of using pointing method, respectively, according to embodiments of the present invention. In order to calibrate the accuracy of pointing according to the present invention a pointing object is identified by camera 220 and supporting software and/or hardware (block 302). Two points, rear and frontal, are identified on the pointing organ or device and a pointing line is calculated between these points (block 304). Optionally a 'trigger' organ or object/assembly are also identified on the pointing organ/device (block 306). A graphical object is presented on screen 212 and a hit point of pointing line 140, 258 on screen 212 is identified (block 308). Finally, the user informs system 100 of the difference between the actual and the intended hit points (block 310). If the accuracy at this stage is not good enough a collection is applied by system 100 and the steps of blocks 308 and 310 are repeated. Once the accuracy of the point of hit is good enough the calibration process terminates.

In a calibrated system the process of using a pointing organ or device may comprise the steps of: pointing object is identified by camera 220 and supporting software and/or hardware (block 352); two points, rear and frontal, are identified on the pointing organ or device and a pointing line is calculated between these points (block 354); optionally a 'trigger' organ or object/assembly are also identified on the pointing organ/device (block 356); a graphical object is presented on screen 212 and a hit point of pointing line 140, 258 on screen 212 is identified (block 358). Finally, data representing the position of the hit point on screen 212 and the activation of trigger 256 (if activated) is sent to system 100 (block 360). This process is repeated as long as the pointing organ/device is in use and may terminate (block 362) at other times.

The above described intuitive point-select-and-activate process may be used in many ways and in many applications. For example it may be used in Human-Machine-Interface (HMI) applications for the activation and control of computer applications, gaming applications and the like. For example the above described intuitive point-select-and-activate process may be used to point-and-shoot action in computer games. In another embodiment of the present invention Thus, the ability of system 100 to identify representative points on an object in the FOI and to deduce a pointing line form this information may be used to allow for intuitive pointing of a user at a scene, for example on a screen. The intuitive pointing may be carried out by drawing a pointing line between an eye of the user and a pointing finger or between two points on a pointing passive object such as a pistol-like piece, and the like. Additionally, the 3-D imaging ability may further be used to identify one or more gesture movements, such as that of the bending of the first finger, as a movement associated with pulling of a trigger and to activate an associated program in system 100 in response. Alternatively, when a pistol-like passive object 250 is used a trigger-like assembly 256 may be configured so that when it is pulled by the user it is easily identified by camera 220 (for example, due to the exposure of high reflectivity portion of the trigger to camera 220).

The invention claimed is:

1. A system comprising:
   a 3-D imaging system that generates a 3D depth image of a user in the field-of-imaging (FOI) of said imaging system, the 3-D imaging system uses Time of Flight (TOF) 3-D imaging, the 3D system identifies at least a first point and a second point based on the 3D depth image, the first point is an eye, the 3D system generates continuous data of the spatial position of the first point and the second point based on the 3D image; and
   a computation system that calculates a pointing line extending from said first point through said second point towards a screen based on the continuous data of the spatial positions, the computation system calculates an imaginary point on said screen at which said pointing line hits said screen.

2. The system of claim 1, wherein said TOF imaging uses at least one of 3-D imaging based on intensity of collected light and 3-D imaging based on phase shift to calculate depth of points in the FOI.

3. The system of claim 1, wherein said computation system:

determines whether the imaginary point coincides with a graphical image on said screen.

4. The system of claim 1 wherein said computation system presents a cursor on said screen at the imaginary point.

5. A method for allowing a user to intuitively point at a screen, comprising:
acquiring a 3D image of the user by using 3-D imaging camera that uses time-of-flight (TOF);
identifying a pointing object in a field of imaging of the 3-D imaging camera;
identifying a first point and a second point on said pointing object, said first point is located substantially close to the rear end of said pointing object and said second point is located substantially close to the front end of said pointing object;
identifying a third point on the pointing object, the third point is associated with a trigger mechanism;
determining 3D positions of said first point, said second point, and said third point based on the 3D depth image;
calculating a pointing line based on said 3D positions, said line extends from said first point, through said second point towards said screen, the calculating includes using the third point to improve the accuracy of the pointing line;
identifying a hit point of said pointing line on said screen; and
providing data of the location of said hit point on said screen.

6. The method of claim 5, further comprising identifying activation of the trigger mechanism.

7. The method of claim 5, further comprising:
presenting a graphical image on said screen; and
determining that said hit point coincides with the graphical image.

8. The method of claim 7 further comprising presenting a cursor on said screen at the hit point.

9. The method of claim 5 wherein said pointing object further comprises a reflective area adapted to be disclosed to said imaging camera when said trigger mechanism is activated.

10. The method of claim 5 wherein said pointing object further comprises a light source adapted to be disclosed to said imaging camera when said trigger mechanism is activated.

11. The method of claim 5, wherein said pointing device is shaped substantially as a pistol.

12. The method of claim 5, wherein the third point is not on the pointing line.

* * * * *